US012181757B2

(12) United States Patent
Yang et al.

(10) Patent No.: US 12,181,757 B2
(45) Date of Patent: Dec. 31, 2024

(54) COMPRESSED SENSING IMAGING METHOD AND COMPRESSED SENSING IMAGING SYSTEM

(71) Applicant: National Tsing Hua University, Hsinchu (TW)

(72) Inventors: Shang-Hua Yang, Hsinchu (TW); Yuan-Hao Huang, Hsinchu (TW); Hao-Yu Yang, Hsinchu (TW); Yi-Chun Hung, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 387 days.

(21) Appl. No.: 17/751,697

(22) Filed: May 24, 2022

(65) Prior Publication Data

US 2023/0168549 A1 Jun. 1, 2023

(30) Foreign Application Priority Data

Nov. 30, 2021 (TW) .................................. 110144561

(51) Int. Cl.
*G02F 1/135* (2006.01)
*G02B 26/08* (2006.01)
(Continued)

(52) U.S. Cl.
CPC ......... *G02F 1/135* (2013.01); *G02B 26/0833* (2013.01); *G02F 1/133553* (2013.01); *G06T 5/50* (2013.01); *G02F 2203/12* (2013.01)

(58) Field of Classification Search
None
See application file for complete search history.

(56) References Cited

U.S. PATENT DOCUMENTS 5,847,790 A * 12/1998 Andersson ............ G02F 1/1418
349/100
8,125,702 B2 * 2/2012 Ward .................. H04N 9/3126
359/259
(Continued)

FOREIGN PATENT DOCUMENTS

CN 104123740 10/2014
CN 105527242 4/2016
(Continued)

OTHER PUBLICATIONS

Hao-Yu Yang et al., "Terahertz Compressed Sensing Imaging via Grayscale Sensing Matrix", 46th IRMMW-THz 2021 Conference, Aug. 29, 2021, pp. 1-2.
(Continued)

*Primary Examiner* — Andrew W Bee
*Assistant Examiner* — Christine Zhao
(74) *Attorney, Agent, or Firm* — JCIPRNET (57) ABSTRACT

A compressed sensing imaging method and a compressed sensing imaging system are provided. In the method, multiple grayscale masks having multiple elements with grayscale values represented by floating-point values or continuous values are generated as sensing matrices based on a compressed sensing theory. A spatial light modulator is controlled to modulate an electromagnetic wave projected on an object under test according to the grayscale value of each element in each grayscale mask, and a physical property of the electromagnetic wave passing through the object under test is detected to obtain multiple measured values. An image reconstruction algorithm is executed to reconstruct an image of the object under test by using the grayscale masks and the measured values obtained from the electromagnetic wave modulated by each grayscale mask.

8 Claims, 5 Drawing Sheets

(51) Int. Cl.
G02F 1/1335 (2006.01)
G06T 5/50 (2006.01)

(56) References Cited

U.S. PATENT DOCUMENTS

| | | | | |
|---|---|---|---|---|
| 8,922,688 | B2 * | 12/2014 | Bridge | G02B 26/0833 |
| | | | | 348/340 |
| 11,204,319 | B2 * | 12/2021 | Dholakia | G01N 21/6458 |
| 2012/0241597 | A1 | 9/2012 | Bridge et al. | |
| 2017/0299375 | A1 * | 10/2017 | Bon | G01N 15/1433 |

FOREIGN PATENT DOCUMENTS

| | | | | |
|---|---|---|---|---|
| CN | 106023116 | | 10/2016 | |
| CN | 108280818 | | 7/2018 | |
| CN | 108447102 | | 8/2018 | |
| CN | 108520235 | | 9/2018 | |
| WO | WO-2011103600 | A2 * | 8/2011 | ......... G01N 21/3581 |
| WO | WO-2020129708 | A1 * | 6/2020 | ......... G02B 26/0833 |

OTHER PUBLICATIONS

Luca Zanotto et al., "Single-pixel terahertz imaging: a review", Opto-Electronic Advances, Sep. 23, 2020, pp. 11-15.

* cited by examiner

COMPRESSED SENSING IMAGING METHOD AND COMPRESSED SENSING IMAGING SYSTEM

CROSS-REFERENCE TO RELATED APPLICATION

This application claims the priority benefit of Taiwan application serial no. 110144561, filed on Nov. 30, 2021. The entirety of the above-mentioned patent application is hereby incorporated by reference herein and made a part of this specification.

BACKGROUND

Technical Field

The disclosure relates to an imaging method and an imaging system, and more particularly to a compressed sensing imaging method and a compressed sensing imaging system.

Description of Related Art

Compressed sensing imaging has attracted extensive attention in recent years since two-dimensional space imaging or three-dimensional space imaging can be achieved by using a high-sensitivity, single-pixel detector, which greatly facilitates numerous specific applications such as astronomy exploration, non-destructive evaluation, industrial inspection, and encrypted image transmission.

A sensing matrix has a major impact on a compressed sensing imaging system. According to a compressed sensing theory, a decrease in mutual coherence of a sensing matrix brings better reconstruction accuracy. To precisely reconstruct images not sparse enough, a sensing matrix with sufficiently low mutual coherence is required. At present, a sensing matrix is often binary and implemented by a spatial light modulator (SLM), which limits elements in a sensing matrix of a compressed sensing imaging system to either 0 or 1. This constraint affects the reconstruction accuracy and seriously limits the industrial application scope of the compressed sensing imaging technology.

SUMMARY

The disclosure provides a compressed sensing imaging method and a compressed sensing imaging system that may physically achieve analog signals in elements and may effectively improve low reconstruction accuracy caused by element limitation.

The disclosure provides a compressed sensing imaging method, adapted for an electronic device with a processor. In the method, multiple grayscale masks having multiple elements with grayscale values represented by floating-point values or continuous values are generated as sensing matrices based on a compressed sensing theory. A spatial light modulator (SLM) is controlled to modulate an electromagnetic wave projected on an object under test according to the grayscale value of each element in each grayscale mask, and a physical property of the electromagnetic wave passing through the object under test is detected to obtain multiple measured values. An image reconstruction algorithm is executed to reconstruct an image of the object under test by using the grayscale masks and the measured values obtained from the electromagnetic wave modulated by each grayscale mask.

The disclosure provides a compressed sensing imaging system, including a first electromagnetic wave generator, a spatial light modulator, a second electromagnetic wave generator, an electromagnetic wave detector, and a control device. The first electromagnetic wave generator is configured to generate an electromagnetic wave. The spatial light modulator is configured to modulate the electromagnetic wave. The second electromagnetic wave generator is configured to generate an electromagnetic wave projected on an object under test. The electromagnetic wave detector is configured to detect a physical property of the electromagnetic wave. The control device is coupled to the first electromagnetic wave generator, the spatial light modulator, the second electromagnetic wave generator, and the electromagnetic wave detector, and is configured to generate multiple grayscale masks having multiple elements with grayscale values represented by floating-point values or continuous values as sensing matrices according to a compressed sensing theory. The control device is also configured to control the spatial light modulator to modulate an electromagnetic wave generated by the first electromagnetic wave generator and projected on an object under test according to the grayscale value of each element in each grayscale mask, and is configured to detect a physical property of the electromagnetic wave passing through the object under test by the electromagnetic wave detector to obtain multiple measured values. In addition, the control device is configured to execute an image reconstruction algorithm to reconstruct an image of the object under test by using the grayscale masks and the measured values obtained from the electromagnetic wave modulated by each grayscale mask.

Based on the above, in the compressed sensing imaging method and system of the disclosure, the grayscale masks represented by the floating-point values or continuous values are generated as the sensing matrices, and the electromagnetic wave projected on the object under test is modulated by using the spatial light modulator. The spatial light modulator could be made of different materials such as metamaterial, low-dimensional material, topological material, spintronic material, or graphene. And there are several ways to implement the spatial light modulator such as a digital micromirror device (DMD), a spinning disk, a liquid crystal on substrate such as a liquid crystal on silicon (LCOS), so as to overcome the limitation that the state of the CS imaging sensing devices is confined to be binary, greatly enhancing the reconstruction accuracy of the compressed sensing imaging technology.

In order to make the aforementioned features and advantages of the disclosure comprehensible, embodiments accompanied with drawings are described in detail below.

DESCRIPTION OF THE EMBODIMENTS

In a compressed sensing theory, a measured value y is a linear combination of an input pattern x, as shown in the following equation (1):

$$y = A\,x \qquad (1)$$

Among the above, A refers to a sensing matrix for defining a linear combination in each measurement.

Mutual coherence (marked as µ(A) below) of the sensing matrix A may be used to measure its ability to restore the input pattern x:

$$\mu(A) = \max_{i \neq j} \left( \frac{A_i^T A_j}{\|A_i\|_2 \|A_j\|_2} \right) \qquad (2)$$

Among the above, $A_i$ is the $i^{th}$ column of the sensing matrix A. More precisely, the input pattern x may be restored most completely under the standard of the following equation $$\|x\|_0 < \frac{1}{2}\left(1 + \frac{1}{\mu(A)}\right) \qquad (3)$$

Among the above, $\|x\|_0$ is signal sparsity.

The above equation (3) shows that a sensing matrix plays an important role in restoring an input pattern in compressed sensing imaging.

Based on the above, to precisely reconstruct images not sparse enough by using a sensing matrix with sufficiently low mutual coherence, the embodiments of the disclosure provide a grayscale modulation method of a terahertz spatial light modulator (THz-SLM), using a spatial light modulator such as a digital micromirror device (DMD) or a liquid crystal on substrate (e.g. silicon, plastic or flexible substrate) to control the transmission power of each THz-SLM pixel. For example, in terms of the DMD, by controlling the number of turned digital micromirrors to synthesize each pixel, profiles of transmitted THz power may be precisely allocated to present floating-point values or continuous values between 0 and 1. In terms of a liquid crystal on silicon (LCOS), by controlling the rotation angle of the liquid crystal in different areas, the electromagnetic wave reflected thereon may generate different phase changes in different areas, such that the wavefront shape of the electromagnetic wave is changed and has different focus points in different areas after passing through a lens, thereby generating a grayscale image on a plane. It is noted, in terms of the DMD, by displaying a pattern of a mask on the DMD and projecting a laser light on the DMD, the reflected laser light forms the mask on the semiconductor, in which the grayscale values controlled by the DMD are floating-point values between 0 and 1 while the grayscale values electrically controlled by the laser light are continuous values between 0 and 1.

Figure 1:
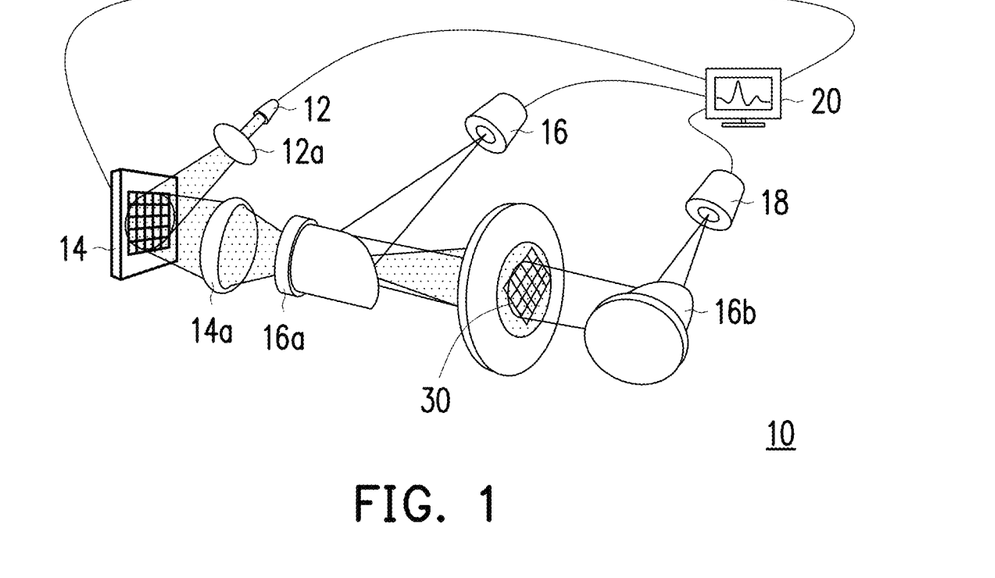
FIG. 1 is a schematic diagram of compressed sensing imaging according to an embodiment of the disclosure.

FIG. 1 is a schematic diagram of compressed sensing imaging according to an embodiment of the disclosure. With reference to FIG. 1, in this embodiment, an electromagnetic wave generator 12 generates an electromagnetic wave, and the electromagnetic wave is projected to a spatial light modulator 14 through an optical component 12a. The electromagnetic wave modulated by the spatial light modulator 14 is projected to an object under test 30 through an optical component 16a after concentrated by an optical component 14a. An electromagnetic wave generator 16 generates an electromagnetic wave, and the electromagnetic wave is reflected by an optical component 16a and projected to the object under test 30. The electromagnetic wave passing through the object under test 30 is reflected by the optical component 16b and is concentrated on an electromagnetic wave detector 18. The electromagnetic wave detector 18 detects a physical property of the electromagnetic wave.

The optical components 12a and 14a above are, for example, electromagnetic wave beam shapers, lenses, waveguides, metalenses, mirrors, and the like. This embodiment does not limit their types. The optical components 16a and 16b above are, for example, parabolic mirrors, and this embodiment does not limit their types either. The center of the optical component 16a has, for example, an opening, which allows the electromagnetic wave concentrated by the optical component 14a to be projected to the object under test 30 through the optical component 16a.

In this embodiment, the spatial light modulator 14 modulates the electromagnetic wave to generate an encoded pattern beam with grayscale information and projects the beam to the object under test 30, interacting with the material of the object under test 30 to change the carrier profile of the material, such that the electromagnetic wave passing through the semiconductor is consistent with the pattern of the beam to implement spatial modulation of the electromagnetic wave. The material includes IV group materials such as Silicon, Germanium or oxidizing materials such as Vanadium oxide.

In the embodiments of the disclosure, the number of turned micromirrors or the liquid-crystal rotation angle in each pixel of the spatial light modulator 14 is changed to indicate sensing matrices formed by grayscale sampling and present floating-point values or electrically controlled continuous values between 0 and 1. After the action of the spatial light modulator 14 to the electromagnetic wave, spatial modulation may be implemented and sampling may be performed to the object under test 30 based on the sensing matrix. Finally, a reconstruction matrix is calculated by executing an image reconstruction algorithm, and an image of the object under test 30 is reconstructed by using the reconstruction matrix and measured values of the electromagnetic wave detector 18.

Figure 2:
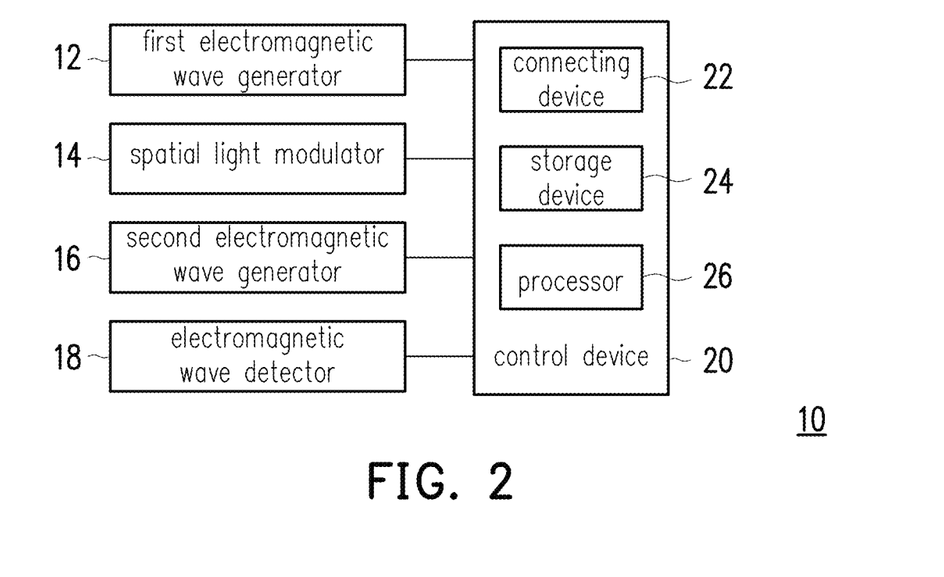
FIG. 2 is a block diagram of a compressed sensing imaging system according to an embodiment of the disclosure.

FIG. 2 is a block diagram of a compressed sensing imaging system according to an embodiment of the disclosure. With reference to FIG. 1 and FIG. 2 together, a compressed sensing imaging system 10 of this embodiment includes the first electromagnetic wave generator 12, the spatial light modulator 14, the second electromagnetic wave generator 16, and the electromagnetic wave detector 18 in FIG. 1, and includes a control device 20 connected to the above devices, whose functions are described as follows.

The first electromagnetic wave generator 12 and the second electromagnetic wave generator 16 may, for example, generate an electromagnetic wave with a frequency between 0.1 and 10 terahertz (THz). This electromagnetic wave (or terahertz wave) has high penetration and non-destructive properties to matter, and properties of matter may be known through a frequency spectrum after penetrated by the terahertz wave. Therefore, the terahertz wave has important applications in food safety inspection, biomedical inspection, or medication inspection. In other embodiments, the first electromagnetic wave generator 12 and the second electromagnetic wave generator 16 may also be wave sources that may generate waves different in time sequence, frequency domains, polarization, or space, such as continuous wave sources, pulse wave sources, broadband wave sources, multifrequency wave sources, narrow-band wave sources, frequency tunable wave sources, polarized wave sources, point wave sources, circular wave sources, top-hat wave sources, random wave sources, or chaotic wave sources. This embodiment does not limit the type. In some embodiments, the first electromagnetic wave generator 12 and the second electromagnetic wave generator 16 may be integrated into one single electromagnetic wave generator, but this embodiment does not limit the implementation.

The spatial light modulator 14 is used to modulate the electromagnetic wave generated by the first electromagnetic wave generator 12. In an embodiment, the spatial light modulator 14 is, for example, a digital micromirror device including more than one million reflective mirrors and using a computer to control the on-off state of these mirrors. If the sensing matrix for compressed sensing imaging is applied to the digital micromirror device, each element in the sensing matrix may correspond to multiple mirrors in the digital micromirror device. For example, if a 32×32 sensing matrix is applied to an 800×1200 digital micromirror device, each element of the sensing matrix may correspond to at least 625 mirrors in the digital micromirror device. Turning part of these mirrors to the opposite side may indicate the grayscale value of each element in the sensing matrix (representing floating-point values or continuous values between 0 and 1). For example, in this embodiment, it may be set that not turning any mirror represents 1 and turning all the mirrors to the opposite side represents 0. In this way, turning part of the mirrors may indicate the floating-point values or continuous values between 0 and 1 according to the proportion between the turned and unturned mirrors.

In another embodiment, the spatial light modulator 14 is, for example, a liquid crystal on substrate controlling the rotation angle of the liquid crystal by a computer to modulate the phase of the electromagnetic wave generated by the first electromagnetic wave generator 12, such that a profile (e.g. an energy profile) of interference light generated by the electromagnetic wave through the action of the liquid crystal on substrate may correspond to the grayscale value of each element of the sensing matrix (representing floating-point values or continuous values between 0 and 1). In addition, by controlling the rotation angle of the liquid crystal in different areas, the electromagnetic wave reflected thereon may generate different phase changes in different areas, such that the wavefront shape of the electromagnetic wave is changed and has different focus points in different areas after passing through a lens, thereby generating a grayscale image on a plane.

The second electromagnetic wave generator 16 is configured to generate an electromagnetic wave directly projected on the object under test 30.

The electromagnetic wave detector 18 is, for example, a detector using a photoconductive antenna or a nonlinear optical crystal to detect a physical property profile of an electromagnetic wave (such as a terahertz wave) passing through the object under test 30, such as a phase profile, amplitude profile, energy profile, a power profile, an electric field strength profile, or a time-resolved electric field profile. In other embodiments, the electromagnetic wave detector 18 may also be used to detect electromagnetic waves such as deep-ultraviolet light, ultraviolet light, visible light, near-infrared light, mid-infrared light, far-infrared light, terahertz light, laser light, millimeter waves, microwaves, and the like, but this embodiment does not limit the type.

The control device 20 is, for example, a personal computer, a server, a workstation, or other computer devices with computing capabilities. The control device 20 includes a connecting device 22 for connecting the first electromagnetic wave generator 12, the spatial light modulator 14, the second electromagnetic wave generator 16, and the electromagnetic wave detector 18, a storage device 24 for storing computer programs and calculation data, and a processor 26 for executing the computer programs and maintaining the overall operation of the control device 20.

The connecting device 22 is, for example, a wired connecting interface such as a universal serial bus (USB), RS232, and an inter-integrated circuit (I2C), or a connecting interface compatible with wireless fidelity (Wi-Fi), radio frequency identification (RFID), Bluetooth, infrared, near-field communication (NFC), or device-to-device (D2D), or other wireless communication protocols that may connect the first electromagnetic wave generator 12, the spatial light modulator 14, the second electromagnetic wave generator 16, and the electromagnetic wave detector 18 in a wired or wireless way of connection. This embodiment does not limit the type.

The storage device 24 is, for example, any type of fixed or mobile random access memory (RAM), read-only memory (ROM), flash memory, hard disk, similar components, or a combination of the above components that may be used to store computer programs or other data executed by the processor 26.

The processor 26 is, for example but not limited to, a central processing unit (CPU) or other programmable general-purpose or special-purpose microprocessor, a microcontroller, a digital signal processor (DSP), a programmable controller, an application specific integrated circuit (ASIC), a programmable logic device (PLD), other similar devices, or a combination of these devices. In this embodiment, the processor 26 loads a computer program from the storage device 24 to execute the compressed sensing imaging method of the embodiments of the disclosure.

Figure 3:
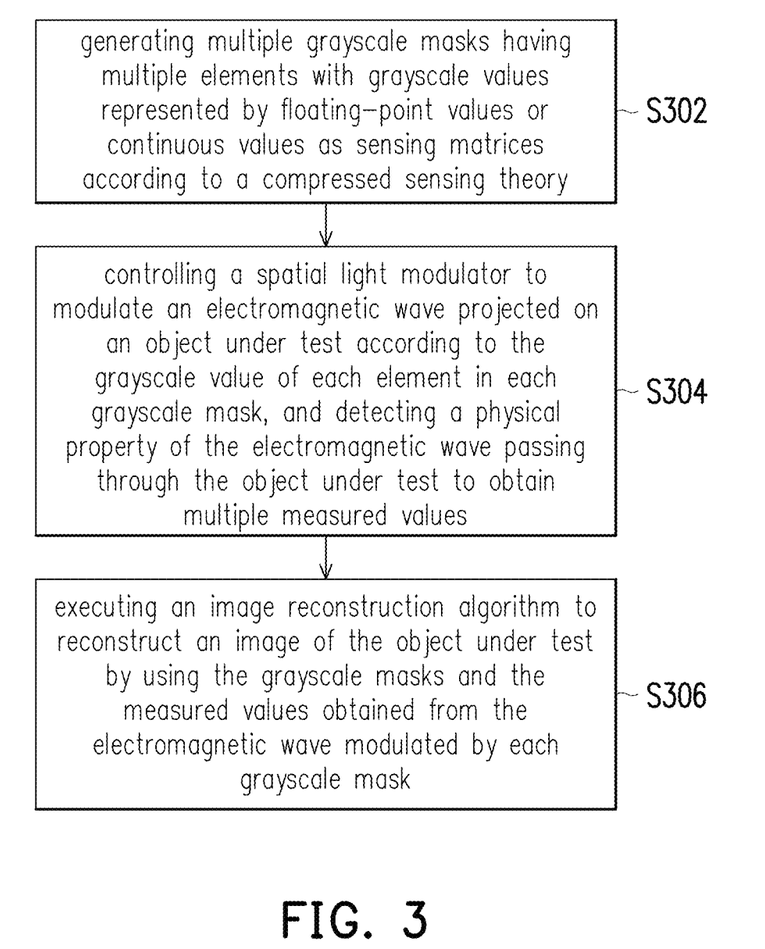
FIG. 3 is a flowchart of a compressed sensing imaging method according to an embodiment of the disclosure.

FIG. 3 is a flowchart of a compressed sensing imaging method according to an embodiment of the disclosure. With reference to FIG. 2 and FIG. 3 together, the method in this embodiment is adapted for the compressed sensing imaging system 10 in FIG. 2. Detailed steps of the compressed sensing imaging method of this embodiment are described below with the devices and components of the compressed sensing imaging system 10.

In step S302, the compressed sensing imaging system 10, for example, uses the control device 20 to generate multiple grayscale masks having multiple elements with their grayscale values represented by floating-point values or continuous values as sensing matrices according to a compressed sensing theory. The grayscale value is, for example, a floating-point value between 0 and 1.

In step S304, the control device 20, for example, controls the first electromagnetic wave generator 12 to generate an electromagnetic wave and controls the spatial light modulator 14 to modulate the electromagnetic wave projected on the object under test 30 according to the grayscale value of each element in each grayscale mask. Moreover, the control device 20, for example, controls the second electromagnetic wave generator 16 to generate an electromagnetic wave and directly project it on the object under test 30, while also controlling the electromagnetic wave detector 18 to detect the power of the electromagnetic wave passing through the object under test 30 to obtain multiple measured values.

In an embodiment, the spatial light modulator 14 uses a digital micromirror device, and the control device 20 controls the turning of multiple micromirrors corresponding to the position of each element of each grayscale mask in the digital micromirror device, such that the profile of the physical property of the electromagnetic wave after modulation may correspond to the grayscale value of each element. The control device 20, for example, turns part of the micromirrors corresponding to the position of each element to the opposite side to indicate a floating-point value between 0 and 1 represented by the grayscale value of each element. The physical property profile is, for example, an energy profile, a power profile, or an electric field strength profile. The embodiment does not limit the type thereof.

In another embodiment, the spatial light modulator 14 uses a liquid crystal on substrate, and the control device 20 controls the liquid-crystal rotation angle of the liquid crystal on substrate to modulate the phase of the electromagnetic wave, such that a profile of interference light generated by the electromagnetic wave with the action of the liquid crystal on substrate may correspond to the grayscale value of each element.

In step S306, the control device 20 executes an image reconstruction algorithm to reconstruct an image of the object under test by using the generated grayscale masks and the measured values obtained from the electromagnetic wave modulated by each grayscale mask. The image reconstruction algorithm is, for example, an orthogonal matching pursuit (OMP) algorithm, a minimum mean-square error algorithm, or other algorithms. The embodiment does not limit the type thereof. For example, the OMP algorithm is a greedy iterative algorithm, which means it has a loop structure. The measured value y and the sensing matrix A in the above equation (1) are regarded as input values, and the object image x may be obtained through the loop structure. In the loop structure, a frequency with high energy is continuously selected as an output value in the frequency domain of a signal and deleted from the original signal. After multiple loops, the output value is continuously modified until the remaining energy of the original signal is less than a set value.

Through the above method, the compressed sensing imaging system 10 in the embodiments of the disclosure may break through the limitation of the traditional binary sensing matrix and control the spatial light modulator 14 to implement the grayscale modulation of the power of the electromagnetic wave, thereby precisely allocating the power profile of the electromagnetic wave. Compared with a binary sensing matrix, the sensing matrix generated by grayscale sampling in the embodiments of the disclosure may achieve higher reconstruction accuracy at the same sampling frequency.

Figure 4A:
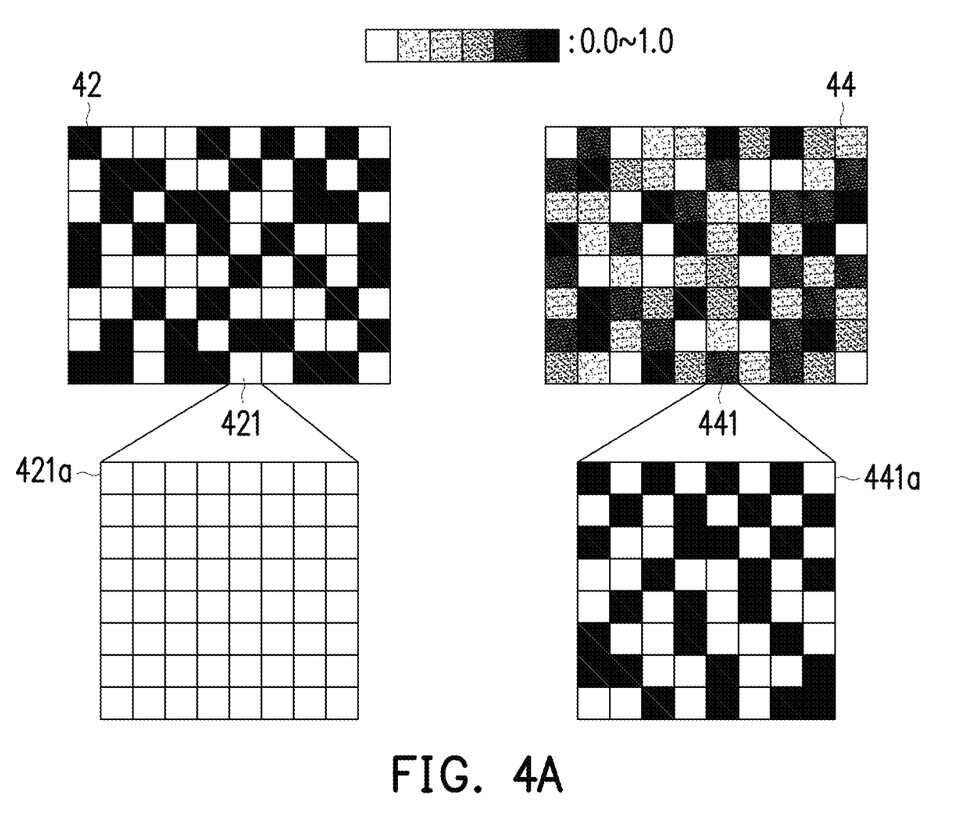
FIG. 4A and FIG. 4B are comparative examples of using a binary sensing matrix and a grayscale sensing matrix to reconstruct an image of an object under test according to an embodiment of the disclosure.

FIG. 4A and FIG. 4B are comparative examples of using a binary sensing matrix and a grayscale sensing matrix to reconstruct an image of an object under test according to an embodiment of the disclosure. With reference to FIG. 4A, values of elements in a binary sensing matrix 42 are either 0 or 1 (represented by white and black images), while values of elements in a grayscale sensing matrix 44 may be any floating-point value or continuous value between 0 and 1 (represented by grayscale images). When the binary sensing matrix 42 is applied to a digital micromirror device, each element therein may correspond to multiple micromirrors in the digital micromirror device. For example, an element 421 may correspond to a micromirror group 421a in the digital micromirror device. Since the value of the element 421 is 0, the corresponding micromirrors in the micromirror group 421a have the same turning direction. On the other hand, when the grayscale sensing matrix 44 is applied to a digital micromirror device, each element therein may also correspond to multiple micromirrors in the digital micromirror device. For example, an element 441 may correspond to a micromirror group 441a in the digital micromirror device. However, since the value of the element 441 is a floating-point value between 0 and 1, the corresponding micromirror group 441a may indicate the value (floating-point value) of the element 441 by turning part of the corresponding micromirrors (such as the micromirrors corresponding to the black images in the micromirror group 421a) to the opposite side.

Figure 4B:
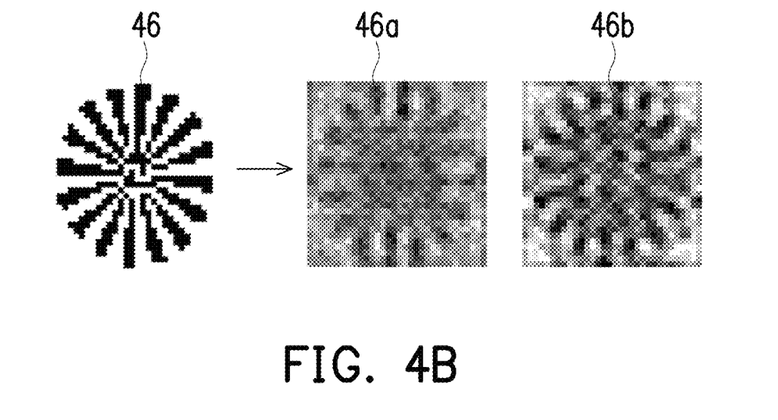

Next, with reference to FIG. 4B, it is assumed that an image 46 is a real image of an object under test. At the same sampling frequency, compared to a reconstructed image 46a of the object under test obtained based on the binary sensing matrix 42, a reconstructed image 46b of the object under test obtained based on the grayscale sensing matrix 44 presents higher reconstruction effect in terms of root mean square error (MSE) and structural similarity index measure (SSIM).

It should be noted that an electromagnetic wave applied to a spatial light modulator, after travels a certain distance, generates corresponding diffraction fringes according to the distance. For example, near-field diffraction fringes are generated if the distance is close enough, while far-field diffraction fringes are generated if the distance is far enough. This affects values displayed by applying the grayscale masks to the spatial light modulator in the embodiments of the disclosure, resulting in inaccurate image reconstruction. In this regard, the embodiments of the disclosure may modify the algorithm for image reconstruction and regard this diffraction as a process of pattern transformation to solve the above problem.

Figure 5:
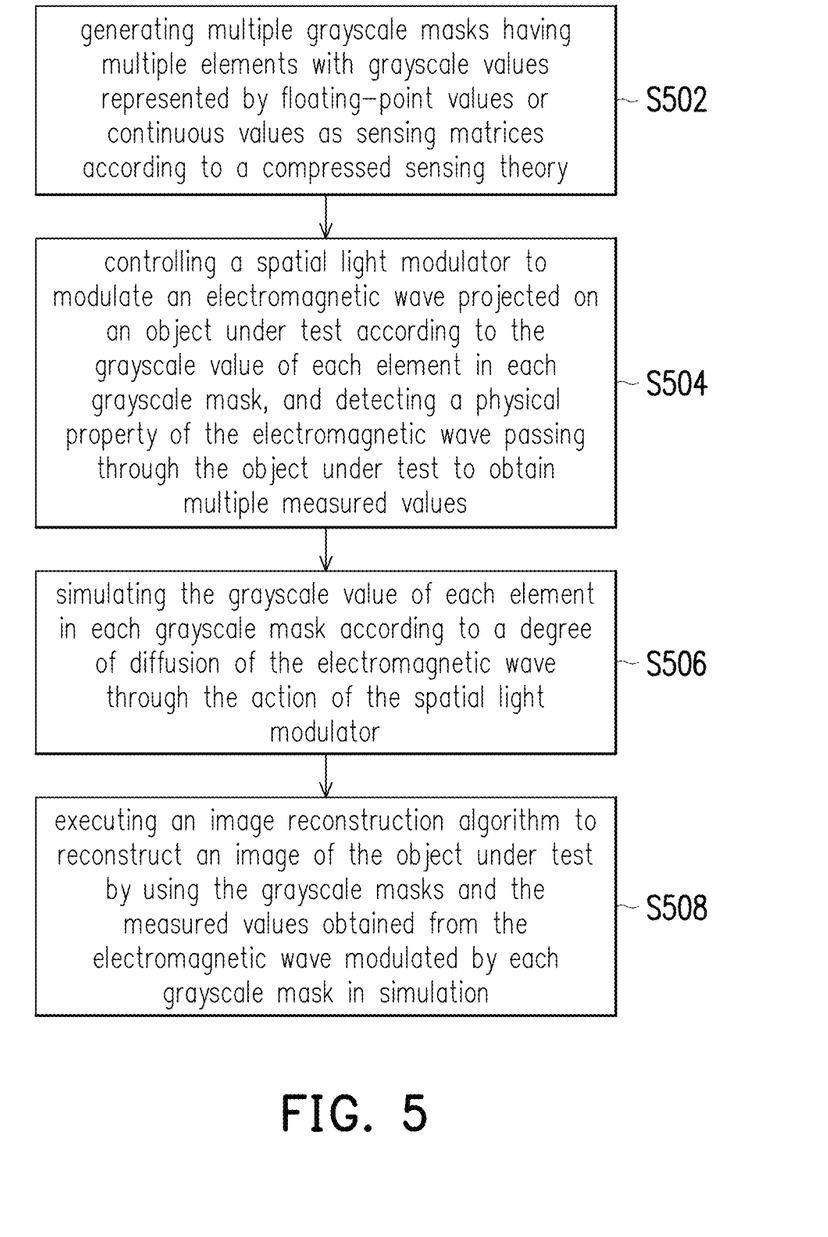
FIG. 5 is a flowchart of a compressed sensing imaging method according to an embodiment of the disclosure.

In detail, FIG. 5 is a flowchart of a compressed sensing imaging method according to an embodiment of the disclosure. With reference to FIG. 2 and FIG. 5 together, the method in this embodiment is adapted for the compressed sensing imaging system 10 in FIG. 2. Detailed steps of the compressed sensing imaging method of this embodiment are described below with the devices and components of the compressed sensing imaging system 10.

In step S502, the control device 20 generates multiple grayscale masks having multiple elements with their grayscale values represented by floating-point values or continuous values as sensing matrices according to a compressed sensing theory. In step S504, the control device 20 controls the first electromagnetic wave generator 12 to generate an electromagnetic wave and controls the spatial light modulator 14 to modulate the electromagnetic wave projected on the object under test 30 according to the grayscale value of each element in each grayscale mask. Moreover, the control device 20, for example, controls the second electromagnetic wave generator 16 to generate an electromagnetic wave and directly project it on the object under test 30, while also controlling the electromagnetic wave detector 18 to detect the power of the electromagnetic wave passing through the object under test 30 to obtain multiple measured values. The implementation of step S502 and step S504 is the same as or similar to step S302 and step S304 in the previous embodiment, so the detailed contents are not repeated herein.

In step S506 of this embodiment, different from the previous embodiment, the control device 20 converts the grayscale value of each element in the grayscale masks according to the degree of diffraction of the electromagnetic wave through the action of the spatial light modulator 14 to send the converted grayscale values to an image reconstruction algorithm for image reconstruction. In this way, value deviation of the grayscale masks caused by diffraction may be corrected.

In step S508, the control device 20 executes the image reconstruction algorithm to reconstruct an image of the object under test 30 by using the converted grayscale masks and the measured values and the measured values obtained from the electromagnetic wave modulated by each grayscale mask.

Figure 6A:
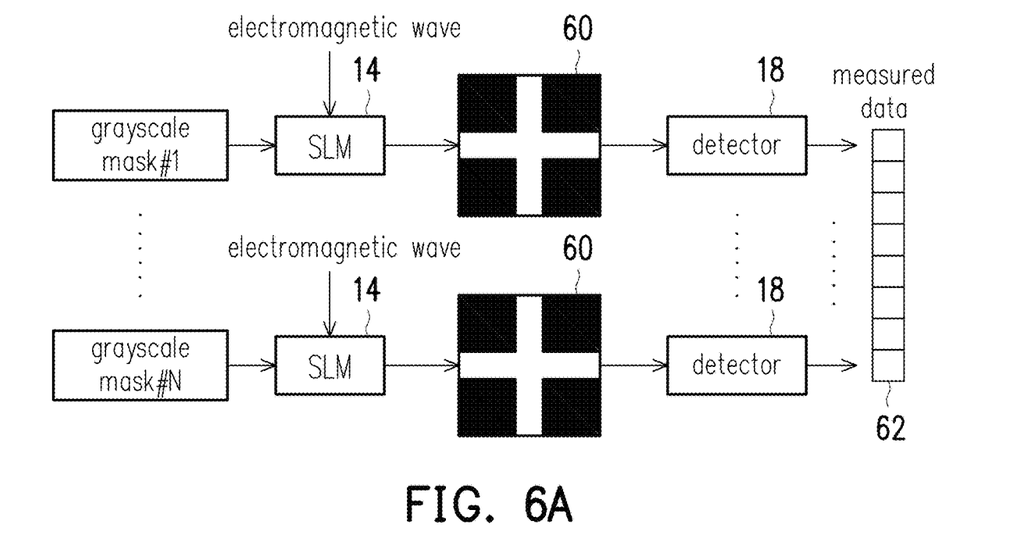
FIG. 6A to FIG. 6C are comparative examples of compressed sensing imaging with and without using a converted grayscale mask according to an embodiment of the disclosure.

FIG. 6A to FIG. 6C are comparative examples of compressed sensing imaging with and without using a converted grayscale mask according to an embodiment of the disclosure. With reference to FIG. 6A, in this embodiment, multiple grayscale masks #1 to #N (where grayscale values of elements are represented by floating-point values or continuous values) are generated first, and the spatial light modulator 14 is controlled to modulate the electromagnetic wave projected on an object under test (assuming that an image 60 is a real image of the object under test) according to the grayscale value of each element in these grayscale masks #1 to #N. In addition, the electromagnetic wave detector 18 detects the property (e.g. power) of the electromagnetic wave passing through the object under test to obtain multiple measured values. The measured values obtained by modulating and detecting the electromagnetic wave with different grayscale masks #1 to #N are, for example, recorded in the storage device 24 of the control device 20 as measured data 62.

Figure 6B:
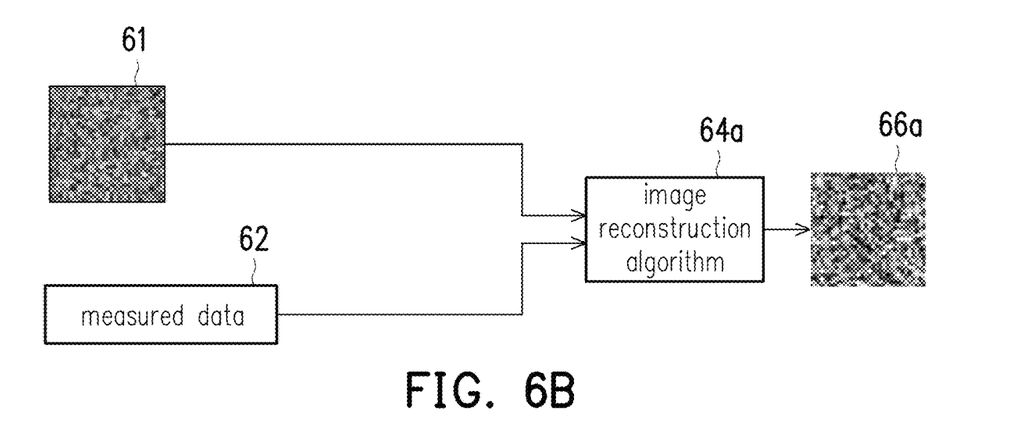

With reference to FIG. 6B, the control device 20 executes an image reconstruction algorithm 64a to calculate a reconstructed image 66a of the object under test by using a generated grayscale mask 61 and the recorded measured data 62.

Figure 6C:
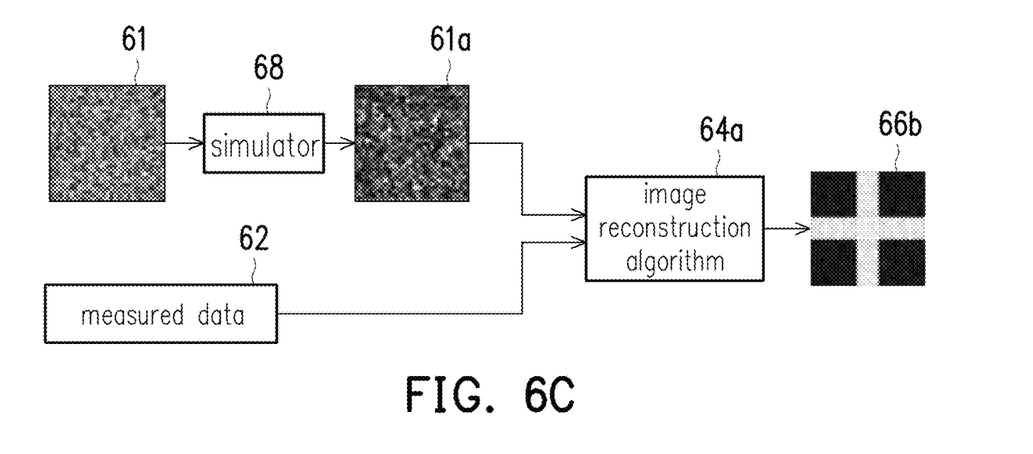

With reference to FIG. 6C, before image reconstruction by the control device 20, a simulator 68 may perform simulation for the grayscale mask 61 in advance by using algorithms such as Rayleigh Sommerfeld formula, plane wave decomposition, or wave propagation methods to simulate a pattern of each grayscale mask 61 after far-field diffraction to generate a simulated mask 61a. Next, the control device 20 executes an image reconstruction algorithm 64b to calculate a reconstructed image 66b of the object under test by using the simulated mask 61a and the recorded measured data 62.

The comparison between the reconstructed images 66a and 66b shows that the image reconstruction with the simulated grayscale masks #1 to #N may solve the problem of inaccurate reconstruction caused by electromagnetic wave diffraction and better restore the real image of the object under test.

In summary, the compressed sensing imaging method and the compressed sensing imaging system in the embodiments of the disclosure incorporate the concept of the grayscale matrix into the compressed sensing imaging system, and implement the system through a digital micromirror device or a liquid crystal on substrate to thereby increase reconstruction accuracy. In addition, for the diffraction caused by the electromagnetic wave through the action of the digital micromirror device or the liquid crystal on substrate, the embodiments of the disclosure modify the calculation process and transform the grayscale masks according to the degree of diffraction before performing image reconstruction, thereby favorably restoring the real image of the object under test.

Although the disclosure has been disclosed in the above embodiments, the embodiments are not intended to limit the disclosure. Persons skilled in the art may make some changes and modifications without departing from the spirit and scope of the disclosure. The protection scope of the disclosure shall be defined by the appended claims.

What is claimed is:

1. A compressed sensing imaging method, adapted for an electronic device having a processor, the compressed sensing imaging method comprising:
   generating a plurality of grayscale masks having a plurality of elements with grayscale values represented by floating-point values or continuous values as sensing matrices according to a compressed sensing theory;
   controlling a spatial light modulator to modulate an electromagnetic wave projected on an object under test according to the grayscale value of each of the plurality of elements in each of the plurality of grayscale masks and detecting a physical property of the electromagnetic wave passing through the object under test to obtain a plurality of measured values;
   executing an image reconstruction algorithm to reconstruct an image of the object under test by using the plurality of grayscale masks and the plurality of measured values obtained from the electromagnetic wave modulated by each of the plurality of grayscale masks;
   simulating the grayscale value of each of the plurality of elements in each of the plurality of grayscale masks according to a degree of diffraction of the electromagnetic wave through action of the spatial light modulator; and
   executing the image reconstruction algorithm to reconstruct the image of the object under test by using the plurality of grayscale masks and the plurality of measured values obtained from the electromagnetic wave modulated by each of the plurality of grayscale masks in simulation.

2. The compressed sensing imaging method according to claim 1, wherein the spatial light modulator is a digital micromirror device, and controlling the spatial light modulator to modulate the electromagnetic wave projected on the object under test according to the grayscale value of each of the plurality of elements in each of the plurality of grayscale masks comprises:
   controlling turning of a plurality of micromirrors in the digital micromirror device corresponding to a position of each of the plurality of elements in each of the plurality of grayscale masks, such that a profile of the electromagnetic wave after modulation corresponds to the grayscale value of each of the plurality of elements.

3. The compressed sensing imaging method according to claim 2, wherein controlling turning of the plurality of micromirrors in the digital micromirror device corresponding to the position of each of the plurality of elements in the plurality of grayscale masks comprises:
   turning part of the plurality of micromirrors corresponding to the position of each of the plurality of elements to an opposite side for indicating a floating-point value between 0 and 1 represented by the grayscale value of each of the plurality of elements.

4. The compressed sensing imaging method according to claim 1, wherein the spatial light modulator is a liquid crystal on substrate, and controlling the spatial light modulator to modulate the electromagnetic wave projected on the object under test according to the grayscale value of each of the plurality of elements in each of the plurality of grayscale masks comprises:
   controlling a liquid-crystal rotation angle of the liquid crystal on substrate to modulate a phase of the electromagnetic wave, such that a profile of interference light generated by the electromagnetic wave through action of the liquid crystal on substrate corresponds to the grayscale value of each of the plurality of elements.

5. A compressed sensing imaging system, comprising:
a first electromagnetic wave generator, configured to generate an electromagnetic wave;
a spatial light modulator, configured to modulate the electromagnetic wave generated by the first electromagnetic wave generator and project the modulated electromagnetic wave on an object under test;
a second electromagnetic wave generator, configured to generate an electromagnetic wave which is projected on the object under test along with the modulated electromagnetic wave;
an electromagnetic wave detector, configured to detect a physical property of the electromagnetic wave passing through the object under test; and
a control device, connected to the first electromagnetic wave generator, the spatial light modulator, the second electromagnetic wave generator, and the electromagnetic wave detector and configured to:
generate a plurality of grayscale masks having a plurality of elements with grayscale values represented by floating-point values or continuous values as sensing matrices according to a compressed sensing theory;
control the spatial light modulator to modulate the electromagnetic wave generated by the first electromagnetic wave generator and projected on the object under test according to the grayscale value of each of the plurality of elements in each of the plurality of grayscale masks and detecting the physical property of the electromagnetic wave passing through the object under test by using the electromagnetic wave detector to obtain a plurality of measured value; and
execute an image reconstruction algorithm to reconstruct an image of the object under test by using the plurality of grayscale masks and the plurality of measured values obtained from the electromagnetic wave modulated by each of the plurality of grayscale masks, wherein
the control device further simulates the grayscale value of each of the plurality of elements in each of the plurality of grayscale masks according to a degree of diffraction of the electromagnetic wave through action of the spatial light modulator and executes the image reconstruction algorithm to reconstruct the image of the object under test by using the plurality of grayscale masks and the plurality of measured values obtained from the electromagnetic wave modulated by each of the plurality of grayscale masks in simulation.

6. The compressed sensing imaging system according to claim 5, wherein the spatial light modulator is a digital micromirror device, and the control device controls turning of a plurality of micromirrors corresponding to a position of each of the plurality of elements in each of the plurality of grayscale masks, such that a profile of the electromagnetic wave after modulation corresponds to the grayscale value of each of the plurality of elements.

7. The compressed sensing imaging system according to claim 6, wherein the control device turns part of the plurality of micromirrors corresponding to the position of each of the plurality of elements to an opposite side for indicating a floating-point value between 0 and 1 represented by the grayscale value of each of the plurality of elements.

8. The compressed sensing imaging system according to claim 5, wherein the spatial light modulator is a liquid crystal on substrate, and the control device controls a liquid-crystal rotation angle of the liquid crystal on substrate to modulate a phase of the electromagnetic wave, such that a profile of interference light generated by the electromagnetic wave through action of the liquid crystal on substrate corresponds to the grayscale value of each of the plurality of elements.

* * * * *